US006026398A

United States Patent [19]
Brown et al.

[11] Patent Number: 6,026,398
[45] Date of Patent: Feb. 15, 2000

[54] SYSTEM AND METHODS FOR SEARCHING AND MATCHING DATABASES

[75] Inventors: David Brown, Sudbury; Paul Beckingham, Newton, both of Mass.

[73] Assignee: iMarket, Incorporated, Waltham, Mass.

[21] Appl. No.: 08/951,688

[22] Filed: Oct. 16, 1997

[51] Int. Cl.[7] .................................................. G06F 17/30
[52] U.S. Cl. .................... 707/5; 707/3; 707/4; 707/6; 707/536; 704/1; 704/8; 704/200; 395/898
[58] Field of Search ................... 707/7, 536, 4, 707/3, 6; 704/8, 1, 200; 395/898

[56] References Cited

U.S. PATENT DOCUMENTS

| 5,758,314 | 5/1998 | Mckenna | 704/8 |
|---|---|---|---|
| 5,787,452 | 7/1998 | McKenna | 707/536 |
| 5,799,302 | 8/1998 | Johnson et al. | 707/7 |

FOREIGN PATENT DOCUMENTS

| 0 583 083 A2 | 2/1994 | European Pat. Off. |
|---|---|---|

OTHER PUBLICATIONS

Brooks, Peter L., "Looking for data in all the wrong places," *DBMS*, vol. 10, No. 11, pp. 70–75, Oct. 1997.

Rosen, Jeff, "A simple Soundex program," *C/C++ Users Journal*, vol. 12, No. 9, pp. 49–51, Sep. 1994.

Zobel, J. and Dart, P., "Finding Approximate MAtches in Large Lexicons," *Software–Practice and Experience*, 25(3): 331–345 (Mar. 1995).

Tarhio, J. and Ukkonen, E., "Boyer–Moore Approach to Approximate String Matching," *Proc. 2nd Scandinavian Workshop on Algorithm Theory*, 447: 348–359 (1990).

Wright, A. H., "Approximate String Matching using Within–word Parallelism," *Software–Practice and Experience*, 24(4): 337–362 (Apr. 1994).

Witten, I. H. et al., "Inverted File Indexing" In *Managing Gigabytes;* (NY: Van Nostrand Reinhold), pp. 79–115 (1994).

Harman, D., "Ranking Algorithms" In *Information Retrieval Data Structures and Algorithms*, W. B. Frakes et al., eds. (NJ: PTR Prentice–Hall, Inc.) pp. 363–382 (1992).

Frakes, W.B., "Stemming Algorithms" In *Information Retrieval Data Structures and Algorithms*, W. B. Frakes et al., eds. (NJ: PTR Prentice–Hall, Inc.) pp. 131–150 (1992).

Du, M.–W. and Chang, S.C., "An Approach to Designing Very Fast Approximate String Matching Algorithms," *IEEE Transactions on Knowledge and Data Engineering*, 6(4): 620–633 (Aug. 1994).

Ukkonen, E., "Finding Approximate Patterns in Strings," in *Journal of Algorithms*, 6: 132–137 (1985).

Ukkonen, E., "Approximate String–matching with q–grams and Maximal Matches*," *Theoretical Computer Science*, 92: 191–211 (1992).

http://www.genealogysf.com/glenda.html.

(List continued on next page.)

*Primary Examiner*—Paul R. Lintz
*Assistant Examiner*—Jean M. Coriélus
*Attorney, Agent, or Firm*—Hamilton, Brook, Smith & Reynolds, P.C.

[57] ABSTRACT

In a database data processing system, input search data is matched against an index of a database to determine database records which either closely or exactly match the input search data. The input search data is broken down into elements, and elements are converted to terms having a finite set of possible values. The Soundex function may be used to convert elements to terms. The terms are compared against an index of terms to determine which database records relate to the input search data. Through statistical analysis, match records are given a record weight which may be used to calculate how closely the input data actually is to each match record. The invention provides a fast and efficient way of accurately searching for data in extremely large databases, while not requiring precise input search data entry. The invention may also be used to compare or supplement one database against another.

48 Claims, 11 Drawing Sheets

OTHER PUBLICATIONS

Kim, J. Y. and Shawe–Taylor, J., "An Approximate String–matching Algorithm," *Theoretical Computer Science,* 92: 107–117 (1992).

Ukkonen, E., "Approximate String–Matching over Suffix Trees*," *4th Annual Symposium on Combinatorial Pattern Matching,* 684: 228–242 (1993).

Galil, Z. and Giancarlo, R., "Data Structures and Algorithms for Approximate String Matching," *Journal of Complexity,* 4: 33–72 (1988).

Schuff, F., "The Sound of Speed," *Database Programming & Design,* 8,2: 46(3) (Feb. 1995).

Prosise, J., "No Matter how you Spell it, Soundex Finds it" *PC Magazine,* 14,10: 261(3) (May 1995).

| | |
|---|---|
| RECORD NUMBER: | 5873 ← 81 |
| CORPORATE NAME: | THE BEST BERGER CORPORATION ← 82 |
| STREET NUMBER: | 1298 ← 83 |
| STREET NAME: | FIRST AVENUE ← 84 |
| CITY / STATE: | BOSTON, MASSACHUSETTS ← 85 |
| ZIP CODE: | 02110 ← 86 |
| PHONE NUMBER: | 617-123-4567 ← 87 |

| | |
|---|---|
| CORPORATE NAME: | B230    B626    C616 |
| STREET NUMBER: | 90 |
| STREET NAME: | F623    A150 |
| CITY / STATE: | |
| ZIP CODE: | 02110 |
| PHONE NUMBER: | |

| INPUT ELEMENT | SOUNDEX TERM/ INDEX ENTRY | TERM SET WEIGHT | TERM SET RECORD IDENTIFIERS |
|---|---|---|---|
| BEST | B230 | 9 | 0356, 1994, 5873, ... |
| BURGER | B626 | 12 | 1234, 2208, 3972, 4521, 5873, ... |
| CORPORATION | C616 | 1 | 1234, 2208, 5873, ... |
| FIRST | F623 | 4 | 1117, 1234, ..., 5873, ... |
| AVENUE | A150 | 2 | 1234, 2786, 3324, 5873, ... |

| MATCH RECORD NUMBER | RECORD WEIGHTS |
|---|---|
| 5873 | 9 + 12 + 1 + 4 + 2 = 28 |
| 1234 | 12 + 1 + 4 + 2 = 19 |
| 2208 | 12 + 1 = 13 |
| 3972 | 12 |
| 4521 | 12 |
| 0356 | 9 |
| 1994 | 9 |
| 1117 | 4 |
| 2786 | 2 |
| 3324 | 2 |

SECOND FUNCTION TESTS:

T1: $C0 < K0$
T2: $C0 > K1$
T3: MEAN (C0, C1, C2) / MEAN (C1, C2) > K3
T4: $C0 / C9 < K4$
T5: $C0 / C9 < K5$
T6: $C0 / C1 > K6$
T7: $C0 / C1 > K7$
T8: $C0 / C1 > K8$
T9: $C0 / C1 < K9$
T10: $C0 / C1 < K10$
T11: $C0 / C1 < K11$
T12: (MEAN (C1, C2, C3) / MEAN (C2, C3, C4)) > K12 AND test 2 = False
T13: $Dn = Cn+1 - Cn$, for n = 0 to 8
    dmin - Min (D0, D1, D2, ..., D8)
    (abs(D0-Dmin)<.0001) AND (C0 > K13) AND (abs(Dmin) < .0001)
T14: MEAN(C0, C1, C2, C3) / MEAN (C4, C5, C6, C7) > K14
T15: (C0/C1) / (C1/C2) > K15
T16: (C0/C1) * K16 < (C1/C2)
T17: St = SUM(Cn * Cn)
    Mt = MEAN(C0, C1,...Ct)
    FOR n = 0 TO t
      Dt = sqrt(abs(St - Mt*Mt))
    D9 > K17
T18: Using same formulas from Test 17: D1/D7 < K18
T19: $Dn = Cn - Cn-1$
    (D0 > K19 AND D1 > K19 AND ... D9 > K19)
T20: MEAN(C1, C2, C3) / MEAN(C2, C3, C4) < K20 AND Test3 = False
T21: $C9 > K21$
T22: $C1 > K22$

T23

LEGEND

Vhit = W2 + W3 + W5 + W7 + W8 + W13 + W15 + W17

Vmiss = W1 + W4 + W5 + W9 + W10 + W11 + W18 + W19 + W20

Vmulti = W2 + W4 + W5+ W9 + W10 + W11 + W12 + W14 + W16 + W18 + W21 + W22

Cn = Record Weight of Match Record n
Wn = Test Weight value of Test Tn
Kn = Fixed Constant
MEAN = Mathematical mean
SUM = Mathematical sum
min = minimum value
abs = absolute value
sqrt = square root

FIG. 11

MULTIPLE CONDITION

HIT CONDITION

MISS CONDITION

Q-Gram Method:

BEST BURGER CORPORATION
↖
120

| PHONE NUMBER: | COMBINATIONS: |
|---|---|
| 617-672-9200 | 617-672-9200 |
| ↖ | 617-672-920? |
| 111 | 617-672-92?? |
|  | 617-672-9??? |
|  | 617-672-???? |
|  | ???-672-9200 |
|  | ???-672-920? |
|  | ???-672-92?? |
|  | ???-672-9??? |
|  | ???-672-???? |
|  | ↖ |
|  | 110 |

FIG. 14

SYSTEM AND METHODS FOR SEARCHING AND MATCHING DATABASES

BACKGROUND OF THE INVENTION

In database data processing systems, it is often desirable to provide efficient, high-speed data access and searching capabilities for data stored in a database. A typical database system provides an index mechanism for accessing records of data in the database, without having to search through each element of data stored in each data record. There are many database indexing, accessing and searching techniques in widespread use.

As an example, a database containing records of corporate names and addresses may be indexed by company name. Each record in the database may contain address and other information for one specific company. Records may be sequentially stored in one large file, for example, on a computer readable disk. An ordered index of the company names may also be stored in a table on the disk. Generally, one corporate name entry exists in the index for each record in the database. Because the index is ordered, for example alphabetically, corporate names may be searched based on their position within the index. Each index entry also contains a reference to its corresponding database record.

To search the index, a search name is provided by a user or program. The search name is then compared with company name entries in the index. The search may start, for example, at an index entry for a corporate name beginning with the same first letter as the search name. Index entry names are then compared with the search name. When a match is found, the reference, such as a memory address or record number, provided by the index entry for the matching company name, is followed to obtain the entire company record from the database. Indexing provides a way to access data without having to search every record when looking for specific information in the database.

Tree-based indexes are another form of indexing and searching mechanism. In tree-based index database systems, a common data field in each database record is used as a keyword to create the index. The index is organized as a tree data structure, having a head node where searches begin, and one or more branch nodes referenced from the head node. All other nodes below the head node may also contain one or more branches referring to other nodes. Each index node contains one or more pointers, such as record numbers, to that node's respective data record within the database.

To search the tree index, a search value is provided by a user or program. The search value is then compared with node values beginning with the head node. At each node in the tree, if the search value occurs, for example, alphabetically before the current node's value, one branch may be followed to the next node, but if the search value occurs alphabetically after the current node's value, another branch to a different node may be taken. If the search value and node value are equal, a matching node has been found. The matching node's corresponding database record reference is used to retrieve the matching search data from the database.

The aforementioned database indexing and searching techniques are, however, generally slow and cumbersome when applied to very large databases. These types of indexes often have a one-to-one index entry to record relationship. Search times for a single search value in a one-to-one index, for example, may be on the order of $Log_2 N$. A search for one value may be relatively quick, but a search for many matching records of many search values quickly becomes time consuming. In databases containing millions of record entries, searching multiple values may require long search times to find many record matches. Long search times are unacceptable for certain types of real-time applications.

Another type of index is the inverted index. In inverted indexes, a single index entry may reference many database records. Inverted indexes have been used successfully to produce large numbers of look-ups in a database. Consider an inverted index used to index a large collection of documents through the words contained in those documents. Each document may be viewed as a database record. In a simple index created from a small dictionary of the English language, about one million different words provide a fairly robust vocabulary, and the inverted index for this vocabulary contains an index entry for each of the one million words. Each word entry in the index references every document in which that word exists. Searching for multiple matches per index entry is generally faster when using inverted indexes, since each index entry may reference many database records.

The inverted index has been used successfully in Marketplace™ software, sold by iMarket, Inc., to search one large database. That software includes an inverted index to selected fields of the large database. Search criteria obtained from a user is applied to the index to locate matching records in the database. To minimize the storage space required by the large inverted index, the records containing each specific term within the index are identified by a bit map for that term. The storage required by the bit map is itself reduced by the use of a range definition for multiple adjacent records containing the same term. Bit map indexes may be used with limiting fields, such as a ZIP code, to select only those records within a specific range of record numbers identified by the bit map. For more information on inverted indexes, the reader may consult "Managing Gigabytes: Compressing and Indexing Documents and Images" by I. Witten, A. Moffat and T. Bell, 1994, Van Nostrand Reinhold, Inc., which is incorporated herein by reference.

SUMMARY OF THE INVENTION

When attempting to match search data with database records using a searching technique, a problem occurs with misspellings or dropped elements in the search data. If one word of search data is misspelled or missing, it may be difficult to obtain any matching records at all. To overcome this problem, a technique referred to as an approximate string matching algorithm has been used. Approximate string matching algorithms, as their name implies, allow close strings, which are not exactly spelled or pronounced the same, to be matched with each other. For example, they can account for different spellings, misspellings, and different pronunciations. Various approximate string matching algorithms exist.

One such algorithm, referred to as the Soundex algorithm, converts a text word to a short alphanumeric string, called a Soundex term. A full explanation of how various Soundex algorithms work, including examples and variations is provided in the articles: "The sound of speed," *Database Proarammina and Design*, February, 1995, Vol. 8, No. 2 at page 46, and in "No matter how you spell it, Soundex finds it," *PC Magazine*, May 30, 1995, Vol. 14, No. 10 at page 261. Both of these articles are incorporated herein by reference.

There are only a limited number of possible Soundex terms that may be produced from the Soundex algorithm. The Soundex algorithm may be used to convert two words having the same first letter and that sound alike to the same Soundex term. When used to search a database, input search data, converted to Soundex terms, may be matched against a field of each database record that has also been converted to a Soundex term. When used for searching, often the result obtained has too many matching records, thus providing search results overwhelming the user. On the other hand, since the algorithm retains the first letter of each word, it may miss matches between terms such as "Fish" and "Phish", which are phonetically equivalent.

Other approximate string matching algorithms such as Q-Gram are more precise in their ability to detect a match between an input string and a search string. However, these algorithms are very slow and require more processing resources. When using such precise approximate string matching algorithms to match fields of a database, indexing is not generally available since there is a need to access each record of data.

Each of the approximate string matching algorithms either gives broad search results with too many match records, or are very precise in their matching ability, but are also very slow. Thus, a problem exists with current database matching techniques. Generally, the problem is defined as how to find exact record matches, or only the closest few, while still maintaining the broadest possible sweep of all potentially matching database records, and further how to make the search rapidly in a large database.

The present invention provides a database data processing system and method including enhanced database access, indexing, and searching techniques. The invention allows a user or program to provide search data which can be used to produce one or more matching database records. The invention may be incorporated into a system for determining matching database records from two different databases. In such a system, a business, for example, may have a customer database. The customer database may be used as input data for a search of a much larger global business database in order to generate additional customer information or new customer contacts.

Operationally, in this invention, the user need not be overly concerned with the absolute correctness of the input search data. By phonetically encoding the input search data, the invention allows misspellings of words, for example, while still being able to correctly produce accurate search results. Furthermore, the invention provides short search times by providing an inverted index which is well suited for indexing a large date records.

In accordance with the present invention, a method of correlating input data to stored data comprises the steps of receiving input data as a plurality of elements and converting selected elements to a finite family of terms by a first function such that multiple elements may connect to each term. The first function may be a Soundex function which phonetically encodes text elements (e.g.: words) into Soundex terms based on the pronunciation of each text element. The stored data is generally a database of records. Each term is matched against an inverted index of the stored data to obtain a matching term set of database match records. Each entry in the index contains a different Soundex term and references, via its term set, any records in the database which include an element of data which would convert to that Soundex term via the Soundex function. Such an index groups database records based on common data in each record that has been reduced to the Soundex terms. The index provides a map between the input data and the records containing the same or phonetically similar data.

Once matching index entries have been determined, a record weight is computed for each unique match record existing in the matching term sets of those index entries. A second function of record match tests is then applied to certain match records, based on their record weights, to determine a match condition for each match record. The match condition, based on record weights, indicates how close the input data is to certain match records, perhaps identifying a single match record.

Generally, the second function comprises a series of record match tests which operate on the record weights of only the top weighted match records. The second function tests determine if only one match record matches the input data, or if multiple match records match the input data, or if no match records match the input data. By using statistical tests, an accurate mechanism is provided which can quickly find a single match record from millions of database records.

If the second function fails to find a direct "hit" or an acceptable "multiple" record match condition, a third function may be used to determine how close the input data is to the weighted match records. The third function may be a Q-Gram function, which provides string matching capabilities. Using a Q-Gram function, input data strings broken up into many two-letter pairs are compared with a subset of the top record weighted match records, whose data is also converted to two-letter pairs. Depending upon how many two-letter pairs of the input data and match records are the same, a percentage of "closeness" is determined for each match record. The Q-gram function allows the invention to exactly determine a precise match condition for the closest database match records.

In the invention, Soundex functions, as will be explained, create coded Soundex terms that can represent various pronunciations and spellings of similar sounding words by a single Soundex term. By converting alphabetic text fields of the input data into their generic Soundex term, the invention allows a user to misspell a search word, and still perform an accurate search of the database.

The invention may also use indexes created based on combinations of possible data values, such as different combinations of phone numbers. In this aspect of the invention, when a phone number is received in the input data, the invention may select matching index entries for different possible combinations and patterns of digits derived from the input phone number. This alternative indexing mechanism can quickly limit the number of matching database records since a phone number, and its combinations, is a relatively specific piece of identifying information within data records. Thus, a user knowing part of a phone number and any other data relating to a record may quickly limit the matching records in a search.

The invention also provides a pre-limiting step that first selects a limited index range of records from which match records are selected during a search. Limited index ranges are ranges of the index designating only a limited number of database records, within a database of ordered records. The user or program using the invention supplies a limiting field as part of the input data. A geographical location field such as a ZIP code may be used, for example. This limiting field is used to select a limited index range of database records, with each record in the range relating to the geographical location field. In the example, the ZIP code selects that range of database records having the same ZIP code as the ZIP code entered as the limiting field. Using a limited index range allows the invention to dramatically decrease search times by only selecting match records which fall within the limited index range, such as the specific ZIP code range, for example.

The invention may represent the term sets of the inverted index entries, containing record identifiers to match records in the database, in various ways. The record identifiers for a term set may be maintained as a bit-map, as a range of records, or as a list of record numbers, or in any of these combinations together. By selecting various representations to identify database records in a term set of an index entry, compactness of the index may be maximized.

The record weights used in the indexing and the statistical analysis portions of the invention are computed for each unique match record, preferably using term set weights. The term set weight of an index entry inversely reflects how frequently the term for that index entry appears in the database records. The term set weights may be calculated at run-time, or may be precalculated. The record weight for a match record is the sum of all term set weights for term sets of matching index entries in which the match record appears. The record weight of a match record provides a general indication of how "close" the match record data is to the input search data.

The invention also encompasses a method of preparing a weighted index for a database of records of data. This aspect of the invention includes the steps of parsing each record of data in the database into fields and parsing certain text fields of each record into elements. Each element is then converted to a phonetically encoded record term by a first function, such as the Soundex function. Then, an index is created which has one index entry for each unique Soundex term. A term set is created for each index entry. Each term set contains a record identifier for each record in the database which contains an element equivalent, via the first function, to the record term for that index entry. A term set weight is assigned to each index entry indicating the relative number of record identifiers in the term set for that index entry. A term set weight is heavier if the term set contains a smaller number of database record identifiers.

The invention also encompasses a database data processing and searching system. A computer system includes an input device, a processor, an output device, a storage system and a database of records stored on the storage system. The database of records is indexed by at least one index. Each index entry contains a Soundex term and a term set. The term set references records in the database which contains elements of data which convert to the Soundex term of that index entry, via a Soundex function. A field mapper executes on the processor for accepting input search data from the input device. The field mapper generally maps the input search data to one or more record fields compatible with a record format of records in the database. A match engine executes on the processor to convert the input search data in the record fields to Soundex input terms via the Soundex function. Then, the match engine matches each Soundex input term with one of the Soundex terms of an index entry, thus indicating a term set of match records for that Soundex input term.

A record weigher, also executing on the processor, computes record weights for each different match record in the term sets matching the Soundex input terms. Next, a record tester applies a plurality of record match functions to determine match conditions of match records based upon their record weights. A second tester then applies an approximate string matching function to the input search data and the data of certain match records from the database, in an event that the record match functions were unable to determine a match condition by a threshold amount.

The aforementioned aspects of the present invention provide an advanced database data processing system. Search times are greatly reduced and accuracy of searches is increased.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the invention in practice, but rather, are illustrative of certain ways of performing the invention. Others will be readily apparent to those skilled in the art.

FIG. 5 is an example of a typical database record stored in a database.

FIG. 6 shows elements of the input search data after being converted to Soundex terms.

FIG. 9 is a table illustrating the relationship between the input search data and corresponding Soundex index entries including term set weights and the term sets containing record identifiers.

FIG. 10 is a table illustrating the relationship between match records and record weight computations based on term set weights.

FIG. 11 is a list of twenty-two tests which may be used in the second function when determining a match condition.

FIG. 13 is an illustration of how a Q-Gram function breaks down a string of input search data into two letter combinations for comparison against database match record data fields.

FIG. 14 is an illustration of how phone number combinations may used in limiting the number of database search records used to determine a match condition.

DETAILED DESCRIPTION OF PREFERRED EMBODIMENTS

Figure 1:
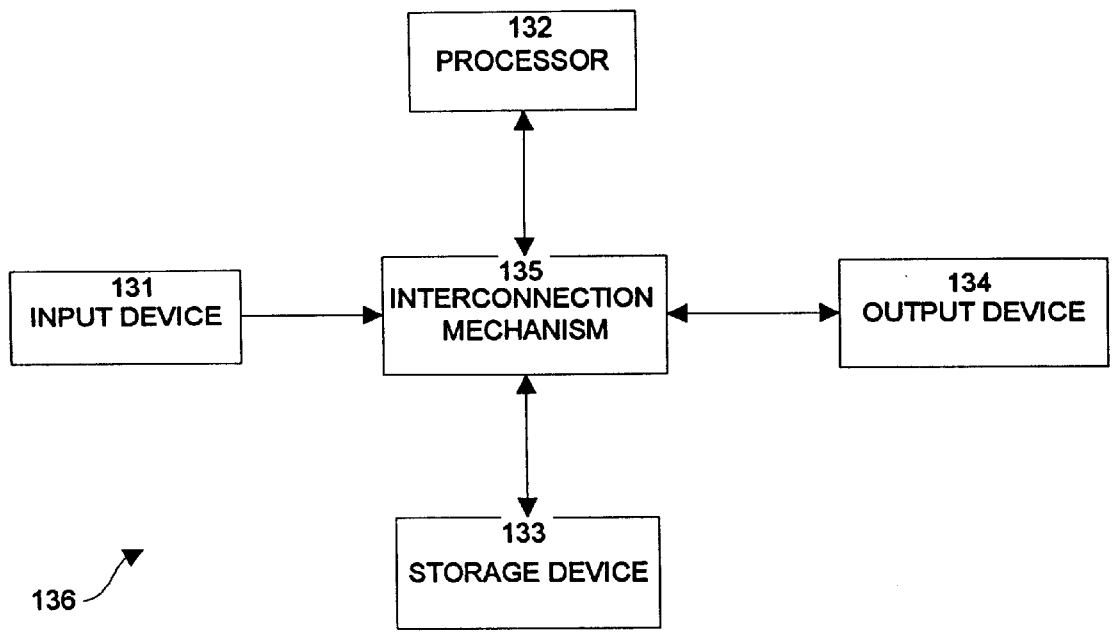
FIG. 1 is an illustration of a computer data processing system on which the present invention may be implemented.

The present invention generally comprises a system and method for searching and matching input search data against a database of records. The invention may be implemented on a computer system such as that represented in FIG. 1. The computer system 136 shown in FIG. 1 represents the generic components 131–135 of most general purpose computers. The computer system 136 comprises an interconnection mechanism 135 such as a bus or circuitry which couples an input device 131 such as a keyboard, a processor 132 such as a microprocessor, a storage device 133 such as a computer disk and an output device 134 such as a monitor or screen. Various embodiments of the invention will be described in conjunction with the components 131–135 of computer systems such as that shown in FIG. 1. A typical example of a computer system 136 is an IBM Personal Computer or compatible.

At a high level, the present invention allows a user or program to supply search data which is then compared against a special inverted index of a database to indicate record identifications from the database that match the search data. The nature of the present invention does not require that the search data exactly match the data stored in any particular database record. For example, misspelled search data may be used and the invention will still turn up the desired matching database records from a search.

By not requiring a user or program to supply search data which exactly matches data in one or more database records, searches for "close" record matches to the search data may be performed. On the other hand, even though supplying "close" search data may produce many record matches, through a unique record testing mechanism, the system still allows the number of "hit" records identified by a search to be limited to one or only a few very close records.

Generally, these opposing objectives are met by phonetically encoding text words of the input search data, via a function such as, for example, a Soundex function. A Soundex function, as will be explained in detail later, is a string reduction process which converts an input string into a short alpha-numerical code, called a Soundex term, which is only equal to one value in a limited family of possible values. An inverted index for the database, created beforehand, contains a separate index entry for every possible phonetically encoded Soundex term. Each index entry also contains references to any database records that contain data which phonetically encodes to the Soundex term for that index entry. By matching each Soundex term derived from the input search data to the corresponding index entry for that same Soundex term, a set of matching database records is obtained for each word of the input search data. Each match record is then statistically weighted and the top weighted match records are then tested to determine if one or more match records closely matches the search data.

Search data may be taken from one database, having a different record format than the database being searched upon, in order to compare the two databases' contents. This particular aspect of the invention may be valuable, for example, to businesses that have a limited customer database and wish to supplement information from a master global database having millions of records. By inputting customer record data from the customer database, businesses that are related in some way to the customer data may appear from a search using the invention.

By phonetically encoding the search data into Soundex terms and providing an inverted index of Soundex terms that reference database records, a common linking mechanism is provided which allows the system to determine different levels of "closeness" relationships between the search data and any matching database records. Through testing of weighted matching database records, the system can determine and then limit the search results to only the closest match records.

Figure 2:
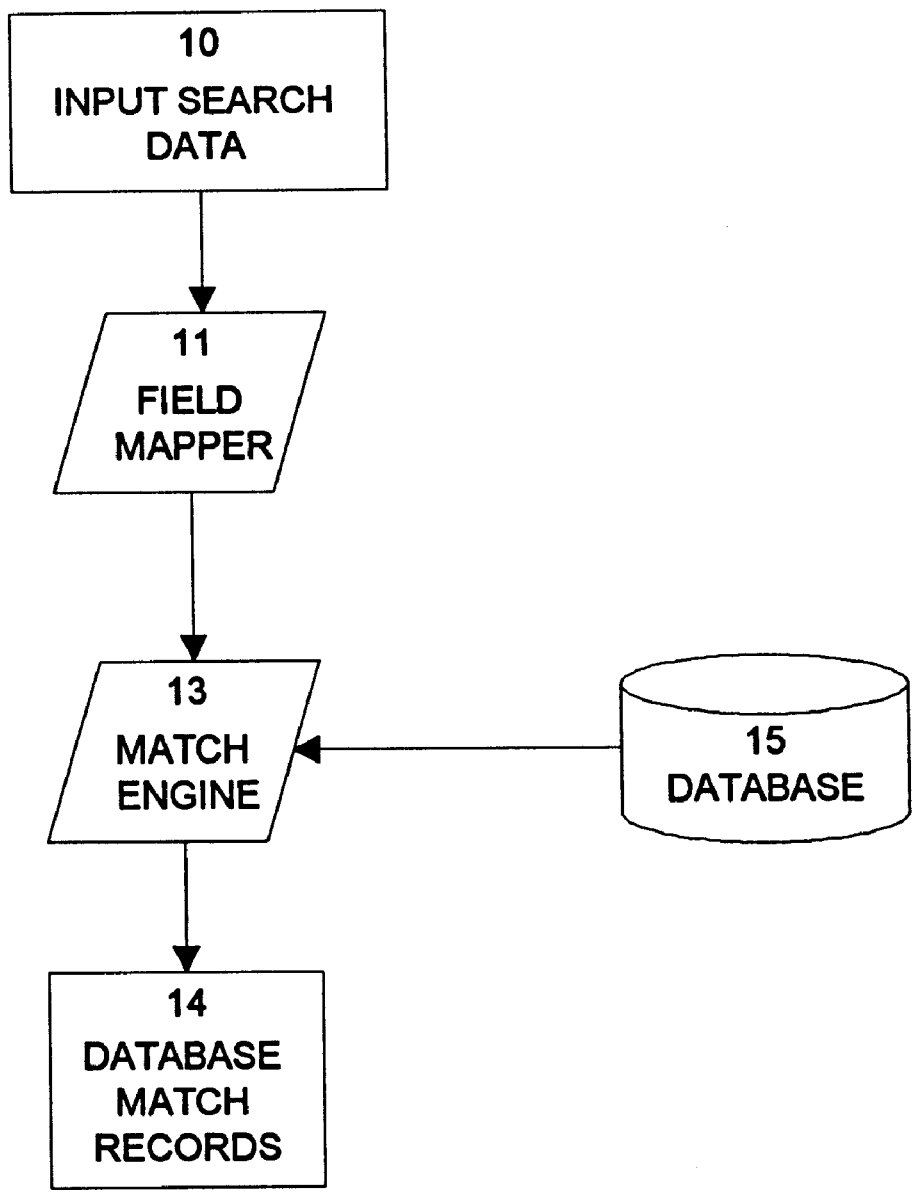
FIG. 2 is a high level data and processing flow chart of the invention which produces database match records as output.
Figure 3:
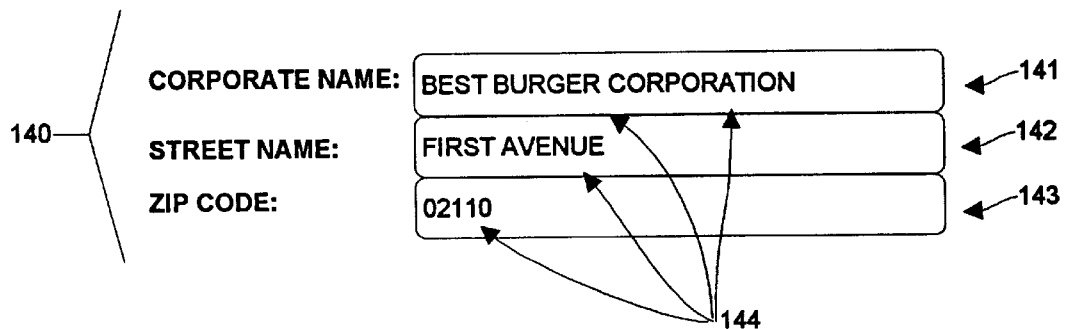
FIG. 3 is an example of input search data being entered into input fields.
Figure 4:
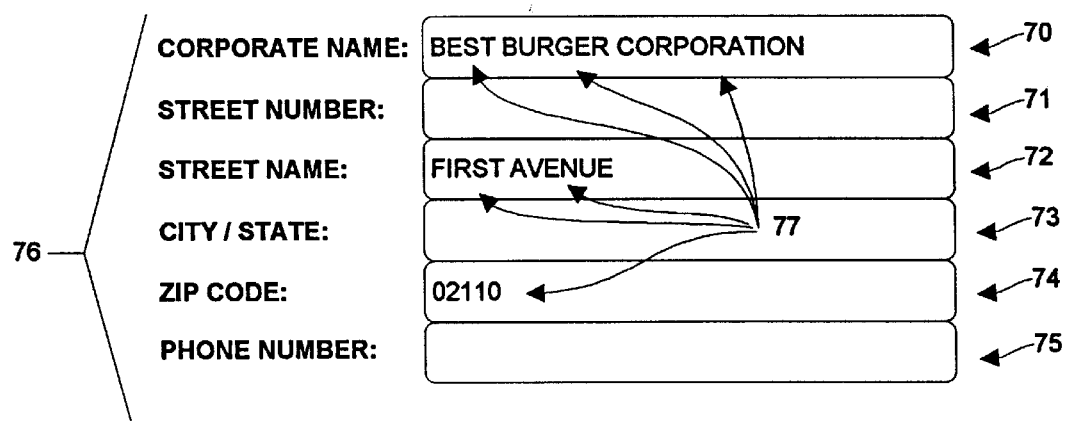
FIG. 4 shows the example input search data of FIG. 3 after it has been mapped by the field mapper into search fields of a record structure.

FIG. 2 shows the general nature of processing of the invention. Input search data 10 is entered into a field mapper 11. The input search data 10 may be obtained, for example, from a user via a graphical user interface, or may be obtained indirectly from a program accessing a database whose records are to be matched against the database 15 searched by the invention. An example of actual input search data 140 is shown in FIG. 3, and includes input fields 141–143 containing input strings 144 of a corporate address. The field mapper 11 in FIG. 2 maps the fields 141–143 of the input search data 140 of FIG. 3 into the corresponding search fields 72, 72 and 74 of the record structure 76, as shown in FIG. 4. The record structure 76 of FIG. 4 has a compatible search field structure 70–75 to records used in the database of the invention, such as example database record 80, illustrated in FIG. 5.

In FIG. 2, after the field mapper 11 has mapped the input search data 140 into the record structure 76 of FIG. 4, the match engine 13 of FIG. 2 receives the record structure 76 and matches, as explained below, elements 77 of this record structure 76 against an index of the database 15. The matching process of match engine 13 may produce many database record identifiers which are then statistically tested, as will be explained, to produce the database match records 14. Database match records 14 are those database records which closely match the input search data 140 of FIG. 3. Detailed operation of the match engine 13 will be discussed later, but for now, an overview of its functionality is presented below in relation to the layout of the database and index used in the invention.

Figure 7:
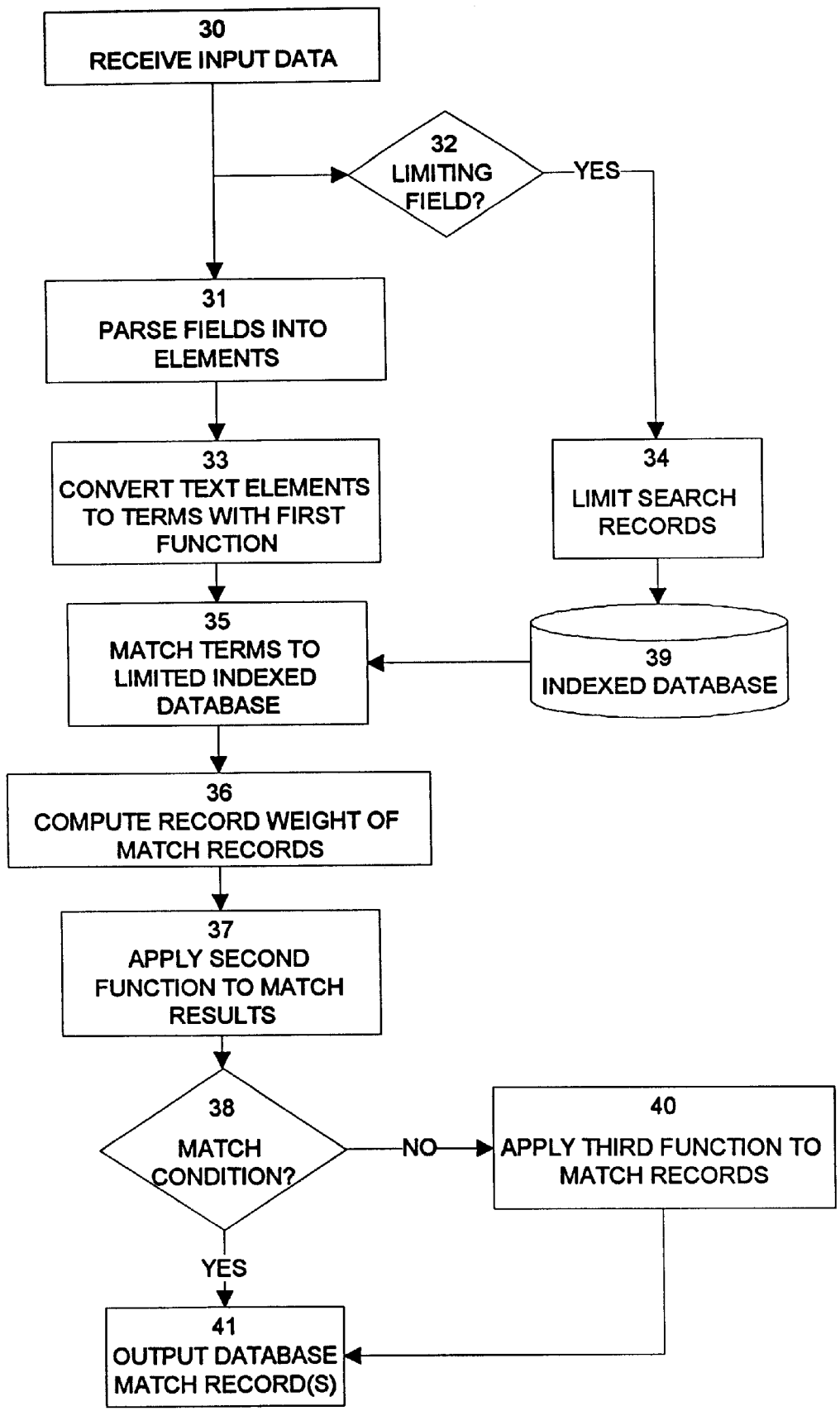
FIG. 7 is a flow chart of processing steps for the match engine of FIG. 2.
Figure 8:
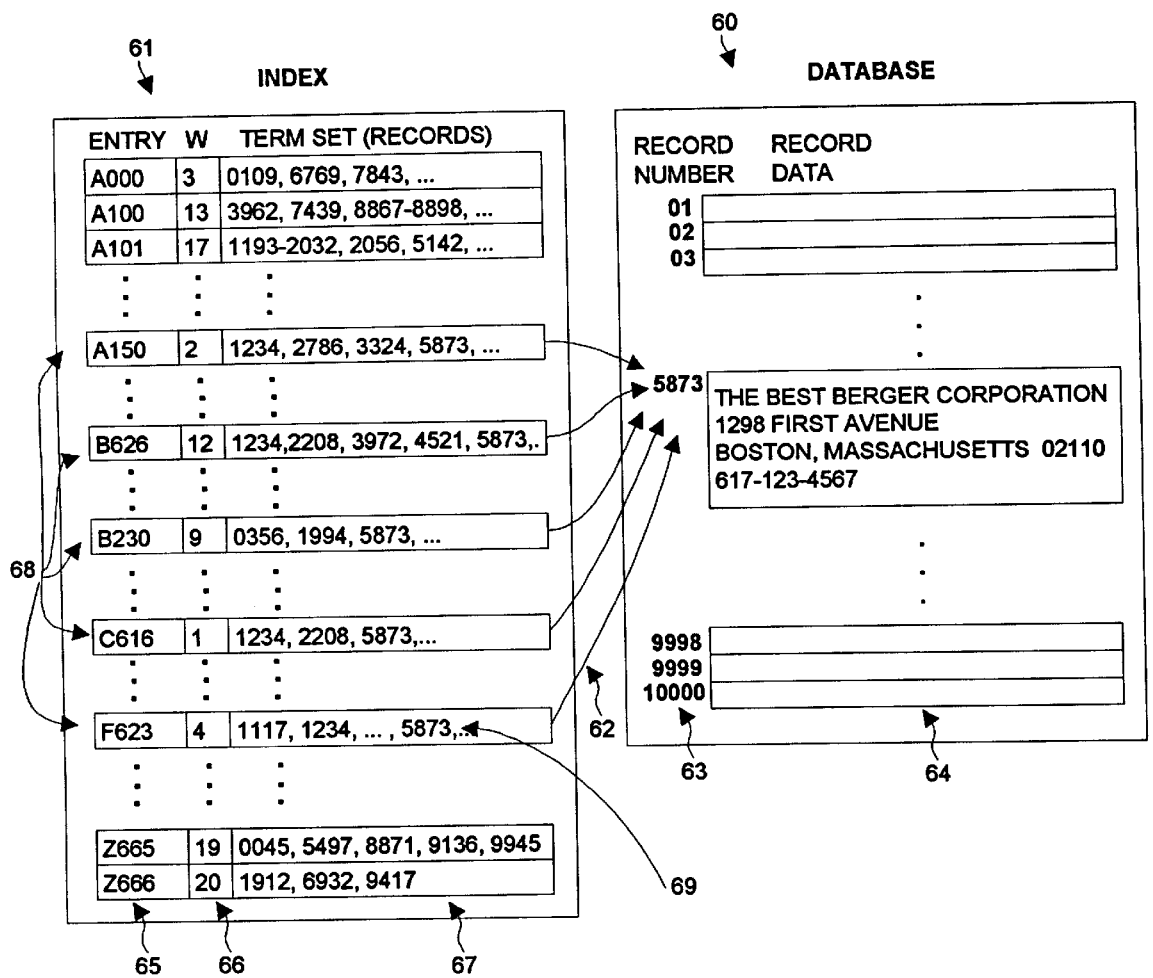
FIG. 8 is an example of the structure and relationship between an index of a database and the database itself.

Generally, the match engine 13 converts elements 77 from FIG. 4 to Soundex terms 90, as shown in FIG. 6. Soundex terms 90 are then compared to an index 61 of Soundex terms 65, as illustrated in FIG. 8. From this comparison, the matching index entries 68 of Soundex terms 90 (in FIG. 6) indicate a plurality of term sets 67 that reference database match records having a relationship to Soundex terms 90. The term sets 67 of each index entry 68 reference database record numbers 63 of records containing data 64 (i.e.: words) which converts to the Soundex term 65 of that index entry. Since the matching index entries 68 were selected based upon the Soundex terms 90 of input elements 77 (FIG. 4), the matching term sets 67 indicate database records containing data that is at least similar to the input search data 140 of FIG. 3. In FIG. 7, an example of a reference to a database match record is the record identifier 69 for database record 5873 in the term set 67 for Soundex term F623.

The match engine 13 of FIG. 2 then uses a statistical analysis technique to determine which of the matching term sets 67 of the matching index entries 68, are closely related to the input search data 140 of FIG. 3. In FIG. 8, each matching Soundex term index entry 68 also has an associated term set weight 66. To perform the statistical analysis, the match engine 13 computes a record weight for each individual match record identifier in each term set 67 for each matching index entry 68. The record weight for a match record is the sum of the term set weights 66 for each term set 67 of each matching index entry 68 in which an individual match record number appears. Once each match record is weighted, the match engine 13 of FIG. 2 performs certain tests, as will be explained, to determine which, of a certain number of top weighted match records, closely matches the input search data 140. The closely matching records are the database match records 14 in FIG. 2.

The invention provides many advantages over the prior art database searching systems. By reducing the input search data to a finite set of Soundex terms, these terms may be quickly compared against an index of terms created from the database. Search times are decreased since there is no need to consult a one-to-one index containing a single index entry for each database record. Moreover, more than one match record may be produced from a search using the invention. By providing multiple match records, broader searching capability is obtained by matching up database records which may only partially match portions of the input search data. Partial record matches may be useful for certain applications. Furthermore, input search data only needs to be "close" to the desired matching data. In this embodiment, by "close" it is meant that the actual spelling of a word, for example, need not exactly match the spelling of the desired search results. The statistical analysis portion of the invention then narrows the broad search results to obtain the closest database match records.

Another advantage of the invention over known searching techniques is the use of separate Soundex terms for each text element of the input search data. This provides a broad sweep of database match records. Since there are multiple Soundex terms converted from multiple input search data elements, many term sets of match records are obtained. If only one Soundex term were used, only one term set would reference only a single set of match records for that single Soundex term. If the first letter of the input search element were misspelled, the matching records may all be incorrect. Instead, using the invention, if one Soundex term of input data happens to be incorrect due to an incorrect input search element, other Soundex terms converted from correct input search elements will bring in the proper match records. After the weighting process is complete, the improperly matching records will be weeded out from the properly matching records. Thus, by matching multiple Soundex terms converted from multiple input search data elements, the matching process is more accurate due to the increased odds that some of the multiple Soundex terms are more likely to be correct.

Details and variations in the operation and processing of the match engine 13 in FIG. 2 will now be described with reference to the flow chart of match engine processing shown in FIG. 7. In conjunction with this description, an example search will be explained to aid the reader in understanding the invention. FIG. 4 shows the example record structure 76 containing the corporate name "Best Burger Corporation," the street name "First Avenue," and the ZIP code "12110" in the search fields 70, 72 and 74, respectively. No search data has been entered for the city, state or phone number fields 71, 73 and 75. The searching application or user may be unaware of the city, state and phone number and may be performing a search to determine this information for the Best Burger Corporation.

As previously noted, FIG. 5 shows the contents of a typical database record 80 from a database used in this example. Each database record is generally associated with a unique corporation and contains data in record fields 81–87, respectively identifying the record number in the database, a corporate name, street number, street name, city and state, ZIP code and phone number. Example database record 80 is for database record number 5873 and contains information for The Best Berger Corporation. Note the spelling of Berger is relatively unique for this company name. The database structure and records used in these embodiments are meant to be general in nature. Actual database implementations used in embodiments of this invention are not limited to specific data types, exact index structures or specific database types or sizes.

Returning to the processing of the match engine shown in FIG. 7, step 30 receives the record structure 76 of FIG. 4 as a series of search fields 71–75. In step 31, each search field 70–75 is parsed into elements (i.e.: elements 77 in FIG. 4) if data is present in the field. An element is equivalent to a single word. For example, step 31 parses the corporate name search field 70 of FIG. 4, of into three elements 77 corresponding to the words "Best," "Burger" and "Corporation." Next, step 33 receives the elements and converts each element which is alphabetical text into a Soundex term with a Soundex function. Numerical elements, such as a ZIP code, street number or phone number are not converted to Soundex terms.

The Soundex function operates only on the alphabetical text elements to create terms having the special Soundex data format. Alphabetical text elements are words comprised of the characters "A" through "Z" and "a" through "z". The Soundex algorithm receives an element and generates a short coded value as the Soundex term. Words that are spelled differently but pronounced the same may be converted to the same Soundex term by the Soundex algorithm. Soundex algorithms for converting words to terms may vary, but the terms produced by Soundex generally begin with the first letter of the word and are followed by a group of numerical digits. As an example, the Soundex term for the word "Robbin" is R150. Note that the Soundex term for a differently spelled but similarly pronounced version of Robbin, "Robbyn," is also R150.

Typically, a Soundex algorithm converts a text word to a Soundex term by storing and removing the first letter of a word, and then computing a numerical representation for the remaining letters of the word and appending this number after the first letter of the original word. The numbers appearing after the first letter are phonetically derived from the pronunciation of the remaining letters of the word. A typical Soundex function, based on the English language, produces approximately 8,000 different possible Soundex terms for any possible input words. Accordingly, any element 77 of a search field in FIG. 4 will translate to one of the approximately 8,000 different potential Soundex terms in step 33 in FIG. 7.

FIG. 6 shows the example record structure 76 from FIG. 4 after each text element in search fields 70 and 72 has been converted to a Soundex term by Step 33 in FIG. 7. In FIG. 4, the three elements "Best", "Burger" and "Corporation" convert to respective Soundex terms B230, B626, and C616, as shown in FIG. 6. Likewise, the two elements "First" and "Avenue" in the street name search field 72 convert to Soundex terms F623 and A150. In FIG. 4, since there are no elements entered for the street number, city/state, and phone number fields (71, 73 and 75), there are no Soundex terms created for these fields, as shown in FIG. 6. Also, since only alphabetical text gets converted to Soundex terms, the ZIP code search field 74 remains unchanged.

In FIG. 7, after step 33 has reduced each text element of the search fields to a Soundex term, step 35 matches each Soundex term to an index of the database 39. The database 39 used in this invention may be a relational or hierarchical type database, or another type. Before details of the matching process of step 35 in FIG. 7 are discussed, an in depth examination of the structure and relationship of the index to the database will now be presented.

As briefly discussed previously, FIG. 8 shows the structure and relationship of portions of an example database 60 and portions of a corresponding example index 61. The example database 60 is a compilation of records (01 through 10000). The records are organized by record number 63 in this example, and not all res record data 64 visible, and corresponds to the example database record 80 shown in FIG. 5.

In the index 61 of FIG. 8, individual index entries exist for each of the 8000 possible Soundex terms 65. Only selected index entries are shown in the example index 61. Each index entry is a single row in the index and comprises three parts 65–67 labeled by index column headings ENTRY, W and TERM SET (RECORDS). For each index entry, the ENTRY column designates the Soundex term 65, the W column designates the term set weight 66, and the TERM SET (RECORDS) column designates the term set 67. Each term set 67 contains the list of database record identifiers, also called references for an index entry. Each record identifier (e.g.: 69 in FIG. 8) identifies a single database record in database 60 that contains a word within one of its record fields (e.g.: 82–87 in FIG. 5) which would convert to the Soundex term 65 of that particular index entry via the Soundex function.

Figure 15:
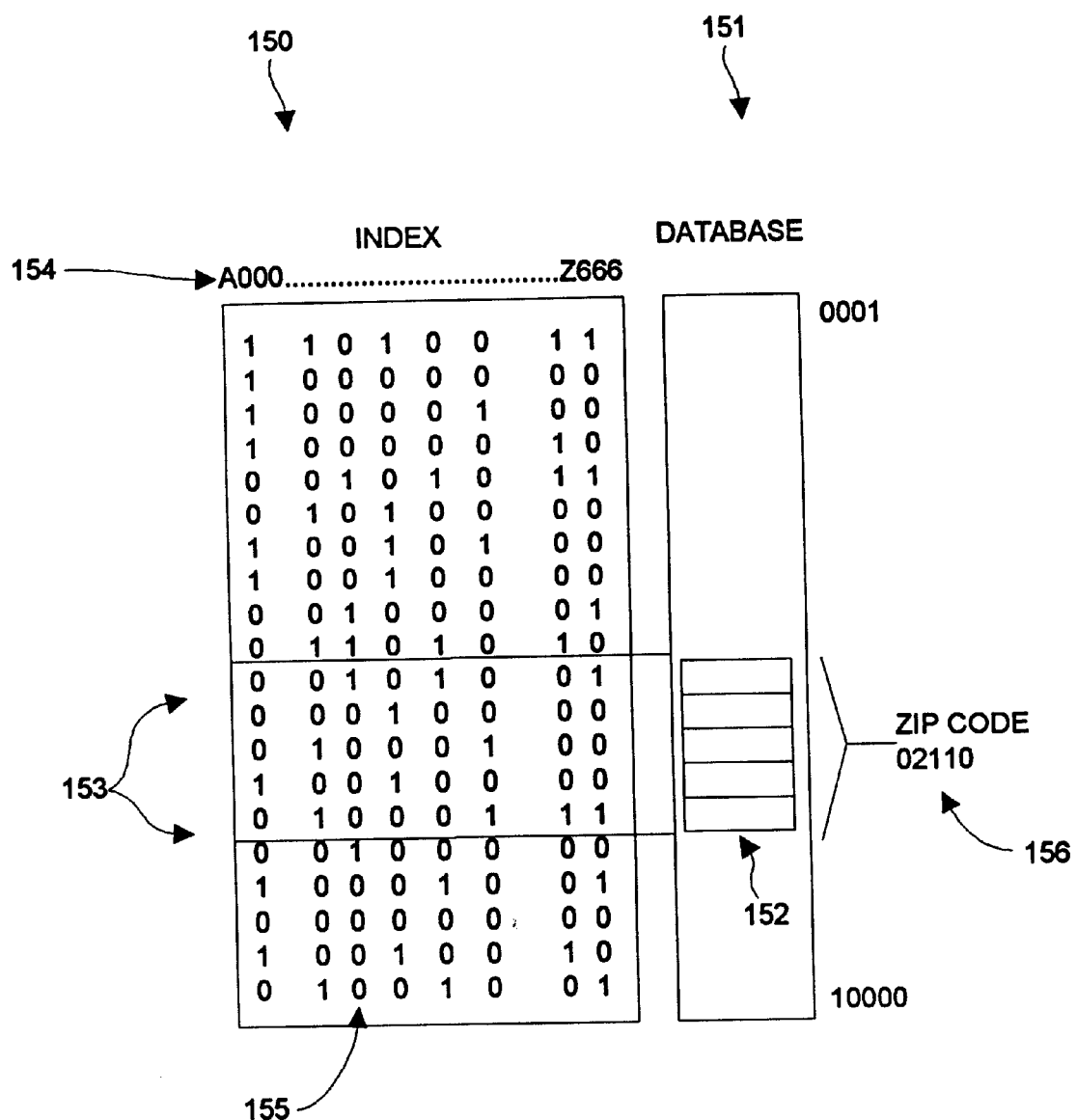
FIG. 15 shows bit-map indexing according to the invention which allows sections of an index to be searched which correspond to record blocks in the database.

The invention includes various ways to represent the database record identifiers within a term set 67. Since each term set 67 is merely a list of references to database records, a term set may be represented by a list of record numbers, such as record number 5873, shown at 69 in FIG. 8. Alternatively, a range of record numbers, such as 1–3000, may be used as a means to identify records in a term set 67. Ranges conserve index space in memory if there are many hundreds or thousands of consecutive database records referenced by a single term set 67. A bit map index 150, as shown in FIG. 15, may also be used as a record identifier mechanism. In a bit map index, each term set is a string of bits equal in length to the number of database records. There is a bit position for each database record in database 151. If a bit position in a term set contains a "1", then the record number corresponding to this bit position is referenced by this term set. If a "0" is present in a bit position, then the database record corresponding to that bit position is not referenced by the term set 155. The invention may also use a combination of bit maps, ranges, and record number lists to serve as a record identifier mechanism for a term set.

An example tying together the different aspects of the database 60 and index 61 of FIG. 8, is presented as follows. In FIG. 8, the index entry for Soundex term B626 is for words, which when pronounced, sound like "Burger" or "Berger." Index entry B626 contains record identifiers for a plurality of database records in its term set 67, including database record numbers 1234 and 5873. As visible in detail in FIGS. 5 and 8, database record number 5873 contains record data for the Best Berger Corporation in record fields 82–87. The term set 67 for the Soundex term index entry B626 references database record number 5873 because the word "Berger" in the corporate name record field 82 (FIG. 5) of this database record converts to Soundex term B626 via the Soundex function. It is important to note that the input element 77 "Burger" from the corporate name search field 70 of FIG. 4 also converts to the same Soundex term B626 (as shown in FIG. 6), even though the spelling of "Burger" and "Berger" are not equivalent. By phonetically encoding input elements with the Soundex function, and indexing the database with the same Soundex function, the invention can determine which database record numbers have words that "sound like" words in the input search data, even though the input search data is not spelled exactly the same as record data in one or more fields in a database record.

The arrows 62 in FIG. 8 show other index entries 68 which also reference database record 5873 in their term sets 67. The index entries 68 correspond to the Soundex terms 90 (FIG. 6) which match the text elements 77 (FIG. 4) of input strings 144 (FIG. 3). In the example index 61 of FIG. 8, there are other index entries which are not shown, but which also reference database record 5873. For example, an index entry for a Soundex term corresponding to the word "The" may also references database record 5873, since the word "The" appears in the database record.

Based on the above description of the database and indexing structure used in the invention, step 35 in FIG. 7 is able to locate term sets 67 for matching index entries 68 and determine a set of match records. FIG. 9 shows a table 104 indicating the relationship, calculated by the processing of step 35, between the input search data text elements 100, the matching Soundex term index entries 101, the term set weights 102, and the term set record identifiers 103, for each matching index entry 68 of FIG. 8. As shown in FIG. 9, each term set 103 for each matching Soundex index entry 101 refers to more than one database record. The set of match records determined in step 35 of FIG. 7 is equivalent to the set of all unique, non-duplicate database record identifiers from the term sets 103 in FIG. 9. As will be described next, after step 35 in FIG. 7 has determined the relationship shown in FIG. 9, step 36 computes a record weight for each unique match record.

As shown by matching term sets 103 in FIG. 9, a relatively large number of database match records is identified and correlated to the relatively small number of input search data elements 100. In order to compute a record weight for each of the individual match record identifiers, the term set weight 102 (also shown as the W column 66 in index 61 in FIG. 8) for each of the matching index entries 101 will be used. A term set weight may be assigned to each index entry during the creation of an index of a database. Alternatively, the term set may be calculated at run time. The term set weight of an index entry is an indication of how many records in the database are referenced by the term set for that particular index entry. An example calculation of a term set weight may be the formula $\text{Log}((N/n)+1)$, where N is the count of database records used by the index, and n is the number of records references within the N records by a single term set. Thus, for an index of the entire database, N is the number of database records, and n is the number of records referenced in the term set for any particular index entry.

Term set weights are inversely proportional to the number of record identifiers listed in a term set for an index entry. If a term set for an index entry has many record identifiers, it will have a relatively low term set weight, whereas if only a small number of database records are referenced in a term set, an index entry will have a relatively high term set weight. In the index 61 of FIG. 8, term set weights 66 may range from 0 to 20. As an example, in FIG. 8, Soundex index entry C616, corresponding to words such as "Corporation," has a low term set weight of 1, since this word occurs in many database address records (only record number 5873 is shown). Conversely, Soundex index entry B626, corresponding to words having pronunciations such as "Burger" and "Berger," has a high term set weight of 19, since these words occur in relatively few database records.

Step 35 of the match engine processing shown in FIG. 7 uses the term set weights (66 and 102 in FIGS. 8 and 9, respectively) to compute the match record weights. A record weight for a match record is the sum of the term set weights 102 for each of the term sets 103 in which the match record identifier appears. If a match record identifier appears in more than one term set, its record weight is the sum of the term set weights of the index entries in which it appears.

Table 107 in FIG. 10 shows the computation of record weights 106 for each match record number 105 shown in term sets 103 of FIG. 9. Record weights, such as those shown in table 107, are computed by step 36 in FIG. 7 for every unique match record identifier in the several matching term sets. Table 107 only shows ten examples of computed record weights. As indicated by the ellipses in each term set, there may be more matching records than those shown in this example.

As examples of the computations of record weights, database record number 5873 is referenced in each term set 103 shown in FIG. 9; whereas, database record number 1234 is referenced in each term set 103 except the term set for Soundex term B230. As shown in FIG. 10, the record weight for match record number 5873 is the sum of term set weights 102 for Soundex index entries B230, B626, C616, F623 and A150, or 9+12+1+4+2, which is equal to 28. Since record number 1234 is not referenced by Soundex term B230, the record weight of database record 1234 does not include the summation of the term set weight for this index entry, and thus has a lower record weight than record number 5873. The record weight for match record number 1234 is only 19, as shown in FIG. 10. As shown above, database records which contain data that closely matches a particular set of input search data elements will be given a record weight indicating such a close relationship due to the number of terms which match and the significance of those terms as determined by the term set weights.

As indicated by a record weight of 16, database record number 1234 contains data that is somewhat "close" to the input search data, but not as close as record number 5873, having the highest record weight of 28, as shown in FIG. 10. Database record number 1234 must contain words which convert, via the Soundex function, to each of the matching Soundex terms shown in FIG. 8, except Soundex term B230. Thus, database record 1234 does not contain a word sounding like "Best" in its data. Corporate address data, such as "Big Burger Corporation, 999 Furst Avenue, Hartford, Conn.," may be an example of address data which exists in database record number 1234, since many of these words match the Soundex terms of the input search data 140 of FIG. 3, except for the word "Best." Even though the word "Furst" in example address record 1234 is not spelled the same as "First," the Soundex term for each word would be the same. This is significant because the street name "First" entered in the input search data 140 in FIG. 3 may have been incorrectly spelled. The Soundex function allows the invention to pick-up words in records sounding like the input data, rather than requiring an exact match between the input data and the database record data.

In FIG. 7, after step 36 computes a record weight for each unique match record, step 37 receives the entire set of match records along with their individual record weights, shown, for example, by the table 107 in FIG. 10. In step 37, a second function is applied to the record weight data which produces output that may be used to determine if a match condition results in step 38. Generally, the second function may be any statistical analysis function which compares the record weights of each unique match record, or a subset thereof, and determines the likelihood of a close match between individual match records and the input search data.

In step 37, only a subset of the entire set of match records and record weights are used when performing the application of the second function record match tests. An alternative aspect to this part of the invention is to use the entire set of match records and record weights. As an example, in step 37, the second function is applied to the match records having the top ten record weights, as shown in the table 107 that is ordered by record weights in FIG. 10. This is because the match records with the top ten record weights are those match records which generally most closely correspond to the input search data. In step 37 of FIG. 7, after processing determines the match records to which the second function record matching tests are to be applied (i.e.: the top ten weighted match records), the second function tests are processed, as explained below.

As shown in FIG. 11, the second function is comprised of twenty-two record match tests T1–T22, which are applied to the ten highest record weights of match records. The objective of the second function is to determine, if possible, whether one or a few of the top ten weighted match records is sufficiently distinct in its weight to be considered a match to the input search data. Each of the twenty-two tests T1–T22 in FIG. 11 manipulates and/or compares one or more of the record weights of certain match records based on statistical criteria. Each record match test outputs a test weight value which may be used in combination with other test weight values to determine the statistical likelihood of a particular match record corresponding to the input search data. Certain tests results may depend on the output of other tests.

In each test T1–T22 shown in FIG. 11, Cn is the record weight of an n-th match record in the ranked list of record weights, shown by the table 107 in FIG. 10 of the example. Since only the top ten match records will be used for the second function tests T1–T22, n ranges from 0 to 9. As shown in FIG. 11, each test operates on certain values, and produces a test weight value Wn depending upon the outcome of the test. Test weight value Wn is a weight associated with an output of the n-th test, with a value of 0 if a test fails, and a value of Kn * (times) Wn if the test passes. Kn is a fixed constant based on the type of data being searched, such as text or other data.

Also shown in certain tests T1–T22 in FIG. 11 are mathematical functions, such as MEAN, SUM, min, abs, sqrt. "MEAN" computes the mathematical mean of its operands. "SUM" is the mathematical sum of its respective operands. "Min" is the minimum value of all of the operands in a set. "Abs" is the absolute value of its operand, and "sqrt" is the square root of its operand.

There are three types of match conditions which may be determined from the record match tests T1–T22 in FIG. 11. For each record weight passed through tests T1–T22 of FIG. 11, a hit, miss or multiple value will be assigned to the corresponding match record. A miss match condition exists when the match record being tested does not closely match the input search data. A multiple match condition exists when more than one match record matches the input search data above a predetermined threshold amount. A hit match condition exists when only one record closely matches the input search data. The definitions of the mathematical functions, as well as the definitions of hit, multiple and miss match conditions are given in the legend box T23, shown below the tests T1–T22 in FIG. 11. This information is shown in the figure, as well as provided here, to assist the reader in understanding this aspect of the invention.

To determine if a match condition exists and whether it is a hit, a miss or a multiple match condition, certain of the record match tests T1–T22 shown in FIG. 11, based on their statistical properties, are designated hit tests, others are designated miss tests, and still others are designated multiple match condition tests. The hit match condition, designated as Vhit, is equal to the sum of the test weights Wn for tests T2, T3, T6, T7, T8, T13, T15 and T17, as shown in legend T23 in FIG. 11. Written as an expression, Vhit=W2+W3+

W6+W7+W8+W13+W15+W17. If the sum of the weights for the hit tests, Vhit, is greater than the sum of the weights for the multiple tests (designated as Vmulti) and is also greater than the sum of the weights for the miss tests (designated as Vmiss), then a match record hit condition has been found.

The multiple match condition, designated as Vmulti, is equal to the sum of the test weights Wn for tests T2, T4, T5, T9, T10, T11, T12, T14, T16, T18, T21 and T22. Written as an expression, Vmulti=W2+W4+W5+W9+W10+W11+W12+W14+W16+W18+W21+W22. If Vmulti is greater than Vhit and is also greater than the sum of the weights for the miss tests, Vmiss, then a multiple match condition record has been found. If a match record record weight run through the tests T1–T22 of FIG. 11 is neither a hit, nor a multiple, then it is a miss match condition record. The miss match condition, designated as Vmiss, is equal to the sum of the test weights Wn for tests T1, T4, T5, T9, T10, T11, T18, T19 and T20. Written as an expression, Vmiss=W1+W4+W5+W9+W10+W11+W18+W19+W20.

Figure 12A:
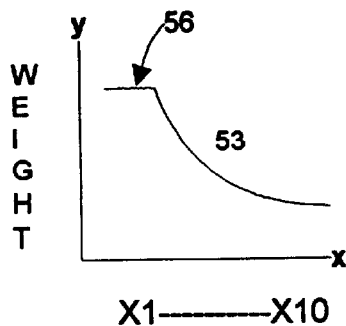
FIG. 12A is a graph illustrating a multiple match condition for a select few of the top ten match record record weights.
Figure 12B:
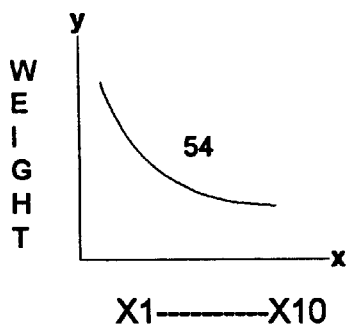
FIG. 12B is a graph illustrating a hit match condition for one of the top ten match record record weights.
Figure 12C:
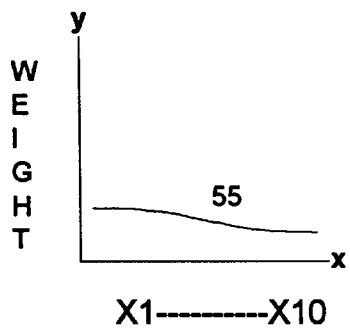
FIG. 12C is a graph illustrating a miss match condition wherein none of the top ten match record record weights match the input search data according to the second function tests.

FIGS. 12A–12C show the graphical relationship of record weights for the three match condition results Vhit, Vmiss, and Vmulti. Each line graph 53–55 of FIGS. 12A–12C plots the individual record weights for the top ten match records as a point on each graph. X1 through X10 on the X axis of each graph represents the top ten individual match record record weights in descending order beginning with X1. The axis labeled Y in FIGS. 12A–12C is representative of the range of record weights.

A multiple match condition is shown in FIG. 12A. In this figure, line 53 indicates that if a record weight X1 is approximately equal to only one or a few other record weights, such as the next closest match record weight, for example X2, then a multiple match condition (Vmulti) has been obtained. Since the two match records' record weights X1 and X2 are about equal, both match records match the input search data equally well. Plateau 56 in FIG. 12A is formed by X1 and X2, as shown in the graph 53, which then quickly drops off after X2 for the plot of the remaining ten record weight values (X3 through X10). It is noted that in an alternative aspect of the invention, more than just two match records may indicate a multiple match condition.

In FIG. 12B, graph 54 shows a hit match condition for the record weight X1 in comparison to other match record record weights. Record weight X1 is plotted high on the curve and stands alone, whereas the remaining record weight points (X2 through X10) drop off successively, with no other record weight being nearly equivalent to X1. Graph 54 indicates a perfect hit match condition (Vhit for only one match record) and signifies that the match record number corresponding to record weight X1 is the single most likely record in the database to match the input search data.

Finally, in FIG. 12C, graph 55 represents a complete miss condition (all match records returned Vmiss from tests T1–T22 in FIG. 11) since record weight X1 is about equivalent to the remaining record weights X2 through X10. In FIG. 12C, since each record weight X1 through X10 does not significantly distinguish itself from any others (i.e.: the graph 55 is flat), no match record stands out as a hit match condition match record.

After all twenty-two tests are performed in step 37 of the embodiment shown in FIG. 7, in step 38, the final results of each of the tests are evaluated to determine if a hit, miss or multiple match condition has been obtained. Step 41 outputs the match condition of each match record which "closely" matches the user input search data via either a hit or multiple match condition (Graphs 12A and 12B). In an alternative aspect to this part of the invention, only the hit match condition match records may be output from step 41. By providing various match conditions, a very precise method of determining which database records match the input search data is provided by the invention.

Sometimes, it is difficult to detect a match condition indicating a hit or multiple condition. In this case, step 40 in FIG. 7 applies a third function to the match records, in the event that step 37 was unable to obtain a match condition after applying the twenty-two statistical second function tests. The third function uses a different analysis on the match records in order to determine if a match condition exists. The third function is called the Q-Gram method.

FIG. 13 shows an example of the operation of the Q-Gram method on a string of text 120. The Q-Gram method compares input strings 144 from the input search data 140 of FIG. 3 with the database record data strings from the corresponding record field 82–87 of FIG. 5, for each of the match records identified in step 36 of FIG. 7. For example, data strings in the top ten database match records may be compared with input search data strings using the Q-Gram function to determine if a match condition can be obtained. For a complete explanation of the Q-gram function, reference is made to "Approximate String-matching with Q-grams and Maximal Matches," Esko Ukkonen, *Theoretical Computer Science*, 1992, pages 191–211, which is incorporated herein by reference.

Generally, as shown in FIG. 13, using the Q-Gram method, example text input string 120 is broken down into two-letter combinations 121 beginning with the first two letters of the input string. In the example, the company name "Best Burger Corporation" 120 is broken down into two-letter pairs 121 starting with "BE". Each successive two-letter pair uses the last letter of the previous pair and the next letter in the word. Step 40 in FIG. 7 performs this Q-Gram string breakdown for each input string in the input fields of the input search data. Likewise, each text record field for the top ten weighted match records in the database(computed from step 36 in FIG. 7) is broken down by the Q-Gram function to create many two-letter pairs per record field. The Q-Gram function in Step 40 then counts how many two-letter pairs of the input search data match two-letter pairs from each match record database record. A percentage of matching pairs is computed for each of the top ten match records.

Based on the outcome of the Q-Gram method, there will generally be a small subset of match records with a high percentage of matching two letter pairs. These are identified as hit match condition match records in the database search and are output in step 41 of FIG. 7. As such, the Q-Gram function or another similar text analysis and comparing function may be used to determine database match records based upon input search data, if the second function of step 37 in FIG. 7 is unable to determine a match.

A key point to note here with respect to this aspect of the invention is that, generally, the Q-Gram method string matching algorithm, when used alone, is a cumbersome approximate string matching function. A relatively large amount of processing time is required to read record data from each database record in order to break down the record fields into letter groups to be compared with the search data. It is impractical to use complex approximate string matching algorithms, such as Q-Gram, as the only mechanisms to detect record matches. However, in this invention, it is possible to use these algorithms, such as the Q-Gram method, since the number of database match records is first selected broadly by the approximate string matching algorithm (i.e.: Soundex) in combination with the inverted index, and then is greatly reduced to only the top weighted match records by the record weighing technique of the invention.

During the previous description of match engine processing of FIG. 7, the discussion of steps 32 and 34 was deferred. Steps 32 and 34 may be used to further enhance the searching capabilities provided by the invention, as will be explained next.

Generally, steps 32 and 34 in FIG. 7 provide the ability to pre-select a limited number of database records, such as a range of record numbers, that are referenced as data base records by terms sets of the input search data. A limiting field, such as a ZIP code, may be used to select only a portion of ordered database records. This portion or range is then used to select database match records in the remaining steps of FIG. 7. An advantage to this aspect of the invention is that many smaller and related subsets of matching records from the entire database may be selected, based upon a sorted order of records in the database. A description of this aspect of the invention will now be given with respect to FIG. 7.

In step 32 of FIG. 7, the input search data from step 30 is checked for a limiting field. A limiting field is a field of input data designated by the user or by another means, such as a program, which may be used to select a limited index range of database records to be used for selecting match records during a search. The limiting field may be, for example, a ZIP code, state or other input search data field.

For instance, for a database of all corporate addresses in the United States, a user may designate the ZIP code input field as the limiting field. The database of records may be ordered by ZIP code region, such that corporate addresses of the same ZIP code all exist within a specific range of database record numbers. For example, for ZIP code 02110, it may be that database records numbered 12,568 through 14,491 are businesses having that ZIP code. When matching input search data to the index entries, only record identifiers within the limited index range will be used as database match records.

In Step 34 the limited index range is determined. The limited index range is the numerical range of database records that contain the limiting ZIP code field in ordered database 39. The limited index range indicates all database address records containing an address having the ZIP code designated by the limiting field. The preferred way to select a limited index range is to separately store each possible ZIP code along with its corresponding range of database records having that particular ZIP code. Step 34 merely finds the limiting ZIP code, and uses the corresponding range of database record numbers as the limited index range.

Step 33 of FIG. 7 then proceeds as previously explained, and converts elements of input search data to terms. Then, step 35 matches each term against the Soundex terms of the index, also as explained previously. However, step 35 only selects record reference numbers falling within the limited index range set by the limiting field in step 34. Thus, the only match record numbers identified will be for database records within the limited index range of database record numbers selected in step 34 (i.e.: those having the limiting field ZIP code).

Step 36 also proceeds to compute record weights as before. However, since only a subset of database records are being used to select matching records (i.e.: the limited index range), the term set weights for an index entry must be calculated at run time. Using the term set weight formula of Log ((N/n)+1), the number of records specified by the limited index range is N, and the number of records referenced by the term set that fall within the limited index range is n. Since the term set weight reflects how many records are referenced by the index term, in relation to how many are being used for the search, by calculating term set weights at run time when using limiting fields, the term set weight reflection is kept consistent. After processing step 36, the resultant match record data is limited only to match records for businesses within the designated limiting field ZIP code.

Using this aspect of the invention, the processing time required for steps 35 and 36 is reduced since the limited index range in use only allows a subset of database records of the entire database to be used as match records. Since the database is ordered by ZIP code in this example, each different ZIP code will have a certain number of business address records falling within a range for that particular ZIP code. It is noted that providing a selectable limited index range of only a portion of the database records may not be necessary for the invention, but is a preferred mechanism for reducing the number of database records used when searching.

As an example of limiting a search to a portion of database records, in FIG. 16, the records of database 151 are ordered based on the ZIP code field of each record 152. Thus, contiguous blocks of records having the same ZIP code are arranged in the database 151. For example, record block 156 contains all records having ZIP code 02110. When the database is organized into blocks of commonly related records, bit-map index 150, as mentioned previously, will contain sections of bits for each index entry, such as section 153, which indicate term set bit patterns that only reference records within that specific record block 156. Each bit position corresponds to a record number in the database. In FIG. 16, bit positions ranging from the first to the last record number in record block 156, for each index entry 154, serve as the term sets 155 referencing only the records 152 of that block 156. Any "1" bits in the term set 155 of a Soundex index entry 154, existing in bit positions ranging from the first to the last record number (shown by block arrows 153), designate records 152 in that block 156 that contain data which converts to the Soundex term 154 of that index entry.

Using an ordered database, the ZIP code obtained in the input search data 140 of FIG. 4 may be used by steps 32 and 34 in FIG. 7 to select a specific limited index range of database records. The range is selected based on the portion of the index 150 of FIG. 16, falling within the range 153 of block 156, determined by the ZIP code limiting field. Only the bit positions in term sets 155 between the first and last record numbers of ZIP code block 156 are considered as the term sets 155 for the matching Soundex index entries 154 during a search. The ZIP code is thus used as a selection field to select a portion of the index 150. Once the portion of the index is selected, the remaining processing of FIG. 7 only selects as match records those record numbers referenced within the block portion 153 of the index 150. These records 152, referenced by the bits within index block arrows 153, have the same ZIP code as the input ZIP code.

The ZIP code limiting feature may use all five digits of a ZIP code entered by the user to select an appropriate portion of index 150 in FIG. 16. Alternatively, only the first three digits of the ZIP code, referred to as a ZIP-3 code, may be used to select a larger block portion of the index. As an example, in FIG. 16, the ZIP-3 code for block 156 is "021". The last two digits, "10", are left off. The "021" ZIP-3 code selects a larger block of database records, having a correspondingly larger section of the index 150. In effect, by using ZIP-3 codes to select portions of index 150, a wider geographical area of database address records may be selected, since ZIP-3 codes cover more towns and cities. By using a ZIP code to select index portions, only database records related to that ZIP code's geographical area will show up as match records. It is also noted that other fields of input search data, such as a state designation, may be used as a limiting field.

The preferred embodiment of the invention comprises all of the steps of the match engine processing shown in FIG. 7. However, the processing of only steps 30–36 in FIG. 7, standing alone, may be valuable to an application interested in ranking all of the match records in a database. After step 36 has completed, an entire set of weighted match records from the database is provided which indicates all associations to the input search data. Certain applications may be interested in knowing the existence of match records with very low record weights, as well as ones with the highest record weights. The processing of FIG. 7, through step 36, is beneficial in itself as a mechanism to rank all matching records, besides just the closest match records.

The invention is not limited to the organization of the steps as shown in the figures. Rather, the above descriptions are meant to be general in nature. An exact arrangement of steps or variations of processing, while still encompassing the general nature and essence of the invention, is contemplated within the scope of the invention. As such, those skilled in the art of database design, searching and indexing techniques, and statistical analysis will readily realize that many possible combinations, arrangements and variations of processing steps disclosed herein are possible, while still remaining within the scope of the invention disclosed.

The present invention, for example may be used with large market databases containing much more information than corporate names and addresses. The invention may be used to search for CEO or Executive names, or any other type of data contained in the database. The actual content of a database is not limited to names or addresses. Document databases containing large text files, documents, or even entire books may be indexed and searched according to the invention. Such variations of data types and database records are meant to be within the scope of the invention.

The present invention is also not limited to using the Soundex function to convert elements of the input search data to terms. Other string matching and reduction functions may be used which condense representations of input search data elements into terms having a finite set of values. Such functions are contemplated as replacing the Soundex function of this embodiment and are meant to be within the scope of the invention. According to this variation of the invention, the index would have terms based on the alternative string reduction values.

The invention may also incorporate alternative indexing mechanisms used in conjunction with the Soundex indexing mechanism previously described. For instance, FIG. 14 shows an example phone number 111 received as part of the input search data. The phone number 111 may be used to derive combinations 110 of phone numbers which closely resemble the input phone number 111. The question marks "?" in the phone number combinations 110 represent wildcard characters. A phone number index of the database, much like a phone book, created beforehand, contains phone number entries, each referencing a corresponding database record containing that phone number. The derived phone number combinations 110 are compared against the phone number index to identify match records referenced by each matching index entry. Each match record is assigned a record weight which corresponds to how close the phone number of the index entry matches the input phone number. If more wildcard characters are needed to match an index entry phone number, the match record referenced by that index entry is assigned a lower record weight. The weighted phone number match records may be combined with the weighted Soundex match records. The match records of these two sets may then be tested, using the record match tests as previously described, to determine how close the match record data is to the input search data.

By providing multiple indexing mechanisms and combining multiple sets of match records, a common set of match records may be produced. Combining indexing mechanisms provides a way for the invention to accurately determine database records that are "close" search criteria as defined by each indexing mechanism.

As briefly mentioned earlier, the invention may be implemented on a computer data processing system such as that shown in FIG. 1. In FIG. 1, the computer system 136 comprises inter-coupled components 131–135. The computer system 136 generally includes an interconnection mechanism 135 coupling an input device 131, a processor 132, a storage device 133 and an output device 134. The input device 131 receives data in the form of commands, computer programs or data files such as databases and other information as input to the computer system 136 from users or other input sources. Typical examples of input devices include a keyboard, a mouse, data sensors, a network interface connected to a network to receive another computer system's output. The interconnection mechanism 135 allows data and processing control signals to be exchanged between the various components 131–134 of the computer system 136. Common examples of an interconnection mechanism are a data bus, circuitry, and in the case of a distributed computer system, a network or communication link between each of the components 131–134 of computer system 136. The storage device 133 stores data such as a database and executable computer programs for access by the computer system 136. Typical storage devices may include computer memory and non-volatile memory such as hard disks, optical disks, or file servers locally attached to the computer system 136 or accessible over a computer network. The processor 132 executes computer programs loaded into the computer system 136 from the input or storage devices. Typical examples of processors are Intel's Pentium, Pentium II, and the 80×86 series of microprocessors; Sun Microsystems's SPARC series of workstation processors; as well as dedicated application specific integrated circuits (ASIC's). The processor 132 may also be any other microprocessor commonly used in computers for performing information processing. The output device 134 is used to output information from the computer system 136. Typical output devices may be computer monitors, LCD screens or printers, or network connections linking the computer system 136 to other computers. Computer systems such as that shown in FIG. 1 commonly have multiple input, output and storage devices as well as multiple processors.

Generally, in operation, the computer system 136 shown in FIG. 1 is controlled by an operating system. Typical examples of operating systems are MS-DOS and Windows95 from Microsoft Corporation, or Solaris and SunOS from Sun Microsystems, Inc. As the computer system 136 operates, input such as input search data, database record data, programs and commands, received from users or other processing systems, are stored on storage device 133. Certain commands cause the processor 132 to retrieve and execute the stored programs. The programs executing on the processor 132 may obtain more data from the same or a different input device, such as a network connection. The programs may also access data in a database for example, and commands and other input data may cause the processor 132 to index, search and perform other operations on the database in relation to other input data. Data may be generated which is sent to the output device 134 for display to the user or for transmission to another computer system or device. Typical examples of the computer system 136 are personal computers and workstations, hand-held computers, dedicated computers designed for a specific purpose, and large main frame computers suited for use many users. The present invention is not limited to being implemented on any specific type of computer system or data processing device.

It is noted that the present invention may also be implemented in hardware or circuitry which embodies the logic and processing disclosed herein, or alternatively, the present invention may be implemented in software in the form of a computer program stored on a computer readable medium such as the storage device 133 shown in FIG. 1. In the later case, the present invention in the form of computer program logic and executable instructions is read and executed by the processor 132 and instructs the computer system 136 to perform the functionality disclosed as the invention herein. If the present invention is embodied as a computer program, the computer program logic is not limited to being implemented in any specific programming language. For example, commonly used programming languages such as C, C++, JAVA as well as others may be used to implement the logic and functionality of the present invention. Furthermore, the subject matter of the present invention is not limited to currently existing computer processing devices or programming languages, but rather, is meant to be able to be implemented in many different types of environments in both hardware and software.

Furthermore, combinations of embodiments of the invention may be divided into specific functions and implemented on different individual computer processing devices and systems which may be interconnected to communicate and interact with each other. Dividing up the functionality of the invention between several different computers is meant to be covered within the scope of the invention.

While this invention has been particularly shown and described with references to a preferred embodiment thereof, it will be understood by those skilled in the art that ve made therein without departing from the spirit and scope of the invention as defined by the following claims.

What is claimed is:

1. A method of correlating input data to stored data, comprising the steps of:
   receiving input data as a plurality of elements;
   converting selected elements to a finite family of terms by a first function, such that multiple elements may convert to each term;
   matching each term against at least one index of the stored data to obtain a matching term set for each term, wherein each term set is a set of stored match records matching a respective term;
   computing record weights for match records existing in the matching term sets; and
   applying a second function to match records based on record weights of match records, to determine a match condition of the match records.

2. The method of claim 1, wherein the first function of the converting step is an approximate string matching function which encodes word elements into terms.

3. The method of claim 2, wherein the first function is a Soundex function and the phonetically encoded elements are Soundex terms.

4. The method of claim 1, wherein term set references to records in the stored data are maintained as a bit-map.

5. The method of claim 1, wherein term set references to records in the stored data are maintained as a range index.

6. The method of claim 1, wherein term set references to records in the stored data are maintained as a list of record numbers.

7. The method of claim 1, wherein term set references to records stored in the stored data are maintained as a list of record numbers, as a range index, and as a bit-map.

8. The method of claim 1, wherein the stored data is ordered such that related records of data occur in sequence with each other; and
   wherein a limiting field of the input search data designates a limited range of records of the stored data from which to select match records in said matching step.

9. The method of claim 8, wherein the stored data is ordered based on a geographical location field of each record, and the limiting field is a ZIP code field of the input search data, used to select a limited range of records each having a common ZIP code field.

10. The method of claim 1, wherein the second function comprises a plurality of record match tests applied to certain match records, based on record weights of the certain match records, to determine a match condition of the certain match records.

11. The method of claim 10, further comprising the step of:
    applying a third function to certain match records if the second function failed to determine that a match record closely matched the input data.

12. The method of claim 11, wherein the third function is an approximate string matching function applied to highest weighted match records to determine a match condition of the highest weighted match records.

13. The method of claim 11, wherein the third function is a Q-gram function which matches portions of text data from the input data to portions of text data from certain of the top weighted match records to determine a percentage likelihood of a match between the input data and the match records.

14. The method of claim 1, wherein the second function includes a miss record match test which determines a miss match condition indicating that some of the certain match records do not match the input data.

15. The method of claim 1, wherein the second function includes a hit record match test which determines a hit match condition indicating that at least one of the certain match records matches the input data.

16. The method of claim 1, wherein the second function includes a multiple record match test which determines a multiple match condition indicating that a plurality of the certain match records closely match the input data.

17. The method of claim 1, wherein the second function includes hit, multiple and miss record match tests, which, when used together, can determine if there are any match records which closely match the input data.

18. The method of claim 1, wherein the second function comprises a plurality of record match tests, and certain outputs of certain of said plurality of record match tests are used as inputs to other of said plurality of record match tests.

19. The method of claim 1, wherein match records are sorted according to record weights before applying the second function.

20. The method of claim 19, wherein the certain match records comprise match records having weights above a predetermined threshold.

21. The method of claim 19, wherein the second function is only applied to a certain number of records of the records sorted according to weight.

22. The method of claim 1, wherein the matching step includes a pre-limiting step that uses a limiting field of the input data to select a limited index range, wherein the limited index range designates a portion of records within the stored data used to obtain the matching term set for each term.

23. The method of claim 22, wherein the at least one limiting field is a geographical location field.

24. The method of claim 23, wherein the geographical location field is a form of ZIP code.

25. The method of claim 22, wherein the at least one limiting field is a numerical element of the input data.

26. The method of claim 22 wherein record weights for match records are computed from term set weights, the term set weights being computed specific to the term sets obtained from the portion of records.

27. The method of claim 26 wherein the term set weight is based on the number of record identifiers in the term set, the term set weight being heavier if the term set contains a smaller number of record identifiers.

28. The method of claim 1, wherein the matching step includes the step of:

matching a phone number element against an index of phone numbers of records of the stored data, to obtain a set of phone number match records; and wherein the computing record weights step includes the step of computing record weights of the phone number match records and combining the phone number match records into the set of match records existing in the matching term sets.

29. The method of claim 28, further comprising the step of:

applying a second function comprising a plurality of record match tests to certain match records, based on record weights of the certain match records, to determine a match condition of the certain match records.

30. The method of claim 1, wherein the computing a record weight for each unique match record step further comprises the step of:

for each match record, summing term set weights for term sets which reference the match records, to produce a record weight for that match record.

31. The method of claim 30, wherein the computing a record weight for each unique match record step further comprises the step of:

obtaining a term set weight for each term set matching each term.

32. A system correlating input data to stored data, comprising:

means for receiving input data as a plurality of elements;

means for converting selected elements to a finite family of terms by a first function, such that multiple elements may convert to each term, wherein the first function is an approximate string matching function which encodes word elements into terms;

means for matching each term against at least one index of the stored data to obtain a matching term set for each term, wherein each term set is a set of stored match records matching a respective term;

means for computing record weights for match records existing in the matching term sets; and means for applying a second function comprising a plurality of record match tests to certain match records, based on record weights of the certain match records, to determine a match condition of the certain match records.

33. The data processing system of claim 32, wherein:

the first function is a Soundex function which phonetically encodes portions of the input search data to Soundex terms and wherein the terms of each index entry are Soundex terms.

34. The database data processing system of claim 33, further comprising:

a means for applying a third function comprising an approximate string matching algorithm test to certain match records, based on record weights of the certain match records, to determine a match condition of the certain match records, in the event that the means for applying a second function fails to determine a match condition.

35. The database data processing system of claim 32, wherein the stored data is ordered such that related records of data occur in sequence with each other; and wherein the system includes a means for obtaining a limiting field of the input search data which designates a limited index range of records of the stored data from which to select match records by said means for matching.

36. The database data processing system of claim 35, wherein the means for applying a second function implements a plurality of statistical record match tests, certain of which produce output that is used as input to other of said record match tests, wherein said record match tests determine how closely match records correspond to the input data.

37. The database data processing system of claim 32, wherein:

each index entry includes a term set identifying records in the database that contain elements that convert to the term of that index entry via the first function; and wherein each index entry has a term set weight indicating the relative number of records in the database referenced in the term set for that index entry, wherein the term set weight is heavier if a term set contains a smaller number of record references.

38. The database data processing system of claim 37, wherein term set record references are represented by a bit-map index.

39. The database data processing system of claim 37, wherein term set record references are represented by a range index.

40. The database data processing system of claim 37, wherein term set record references are represented by a list of record identifiers.

41. A database data processing and searching system comprising:

a computer system including an input device, a processor, an output device and a storage device;

a database of records stored on the storage device and indexed by at least one index having index entries, wherein each index entry contains a Soundex term and a term set referencing records in the database which contain an element of data which converts to the Soundex term of that index entry via a Soundex function;

a field mapper executing on the processor for accepting input search data from the input device, and mapping the input search data to one or more record fields compatible with a record format of records in the database;

a match engine executing on the processor for converting the input search data in the record fields to Soundex input terms via the Soundex function and for matching each Soundex input term with one of the Soundex terms of an index entry, thus indicating a term set of match records for that Soundex input term;

a record weigher executing on the processor for computing record weights for each different match record in the term sets matching the Soundex input terms;

a record tester for applying a plurality of record match functions to determine match conditions of certain match records based upon record weights;

a second tester for applying an approximate string matching function to the input search data and the data of certain match records from the database in an event that the plurality of record match functions are unable to determine a match condition by a threshold amount.

42. A method of matching an input database against a reference database comprising:

providing a geographically sorted reference database of records comprised of elements;

providing a plurality of inverted indexes, each comprising index entries including a phonetically encoded term and a term set indexed by the phonetically encoded term, the term sets containing references to reference database records that contain elements which phonetically encode to the phonetically encoded term of that index entry, and each term set having a term set weight, wherein the term set weight is higher for term sets with a lesser number of references to reference database records;

phonetically encoding elements of records of the input database into input terms;

selecting a portion of records of the input database, based upon a limiting field of the input data, wherein index entries of an inverted index have term sets referencing a limited number of reference database records, based upon the limiting field;

matching the input terms to the phonetically encoded terms of the inverted index entries to determine matching term sets of reference database match records;

computing record weights for each unique match record by summing the term set weights of matching term sets having a reference to the match record;

applying a plurality of second function record match tests, utilizing the record weights of certain match records, to determine a match condition of certain of the match records, said match condition indicating how closely records of the input data base match to records of the reference database.

43. A method of correlating input data to stored data, comprising the steps of:

receiving input data as a plurality of elements;

converting selected elements to a finite family of terms by a first function, such that multiple elements may convert to each term, wherein the first function is an approximate string matching function which encodes word elements into terms;

matching each term against at least one index of the stored data to obtain a matching term set for each term, wherein each term set is a set of stored match records matching a respective term;

applying a second function to match records based on record weights of the match records, to determine a match condition of the match records.

44. The method of claim 43, further comprising the step of:

computing record weights for match records existing in the matching term sets, prior to applying the second function.

45. A computer readable medium encoded with processing logic comprising:

means for receiving input data as a plurality of elements;

means for converting selected elements to a finite family of terms by a first function, such that multiple elements may convert to each term, wherein the first function is an approximate string matching function which encodes word elements into terms;

means for matching each term against at least one index of the stored data to obtain a matching term set for each term, wherein each term set is a set of stored match records matching a respective term;

means for computing record weights for match records existing in the matching term sets; and means for applying a second function to match records based on record weights of the match records, to determine a match condition of the match records.

46. A method of correlating input data to stored data, comprising the steps of:

receiving input data as a plurality of elements;

converting selected elements to a finite family of terms by a first function, such that multiple elements may convert to each term;

matching each term against at least one index of the stored data to obtain a matching term set for each term, wherein each term set is a set of stored match records matching a respective term, the matching step including a limiting step that selects a limited index range, wherein the limited index range designates a portion of records within the stored data used to obtain the matching term set for each term;

assigning a term set weight to each matching term set based on records in the matching term set; and computing record weights for match records existing in the matching term sets from the assigned term set weights.

47. The method of claim 46 wherein record weights are computed for each match record by summing term set weights for term sets which reference the match record.

48. A method as claimed in claim 46 wherein the term set weight is based on the number of record identifiers in the matching term set, the term set weight being heavier if the term set contains a smaller number of record identifiers.

* * * * *

UNITED STATES PATENT AND TRADEMARK OFFICE
CERTIFICATE OF CORRECTION

PATENT NO. : 6,126,398
DATED : October 3, 2000
INVENTOR(S) : Bauer et al.

It is certified that error appears in the above-identified patent and that said Letters Patent is hereby corrected as shown below:

Col. 4, line 51, before "DESCRIPTION" insert --BRIEF--;
Col. 10, line 25, before "to" insert --is rigidly connected--;
line 40, before "a", replace "such" by --Such--;
line 65, before "in", replace "s addle" by --saddle--.

Signed and Sealed this

First Day of May, 2001

Attest:

NICHOLAS P. GODICI

*Attesting Officer*   *Acting Director of the United States Patent and Trademark Office*